United States Patent
Bahl et al.

(10) Patent No.: US 7,110,783 B2
(45) Date of Patent: Sep. 19, 2006

(54) POWER EFFICIENT CHANNEL SCHEDULING IN A WIRELESS NETWORK

(75) Inventors: Paramvir Bahl, Sammamish, WA (US); Atul Adya, Redmond, WA (US); Jitendra D. Padhye, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 10/124,721

(22) Filed: Apr. 17, 2002

(65) Prior Publication Data

US 2003/0203740 A1   Oct. 30, 2003

(51) Int. Cl.
H04B 7/00 (2006.01)
H04B 7/212 (2006.01)
H04Q 7/20 (2006.01)
H04J 11/00 (2006.01)
G06F 15/16 (2006.01)

(52) U.S. Cl. .................. 455/516; 370/208; 370/347; 709/200

(58) Field of Classification Search ............... 455/434, 455/516; 370/347, 208; 709/200
See application file for complete search history.

(56) References Cited

U.S. PATENT DOCUMENTS 5,241,542 A   8/1993   Natarajan et al.

(Continued)

FOREIGN PATENT DOCUMENTS

EP        1089500 A2     4/2001

(Continued)

OTHER PUBLICATIONS

Nandagopal, T., et al., "A Unified Architecture for the Design and Evaluation of Wireless Fair Queueing Algorithms", ACM MobiCom 1999, in proceedings of *The Fifth Annual ACM/IEE International Conference on Mobile Computing and Networking* pp. 132-173 (Aug. 1999).

(Continued)

*Primary Examiner*—William D. Cumming
(74) *Attorney, Agent, or Firm*—Wolf, Greenfield & Sacks, P.C.

(57) ABSTRACT

A method and system for optimizing channel access scheduling for multiple wireless computing devices over a wireless network improves channel access efficiency with respect to a primary channel. An access point, or host computer, includes a host transceiver for receiving control information from the wireless computing devices over a low power channel. Upon receiving the control information, the access point applies a scheduling algorithm to schedule channel access for the wireless computing devices to transmit data over the primary communication channel. The wireless computing devices include a low power radio for receiving scheduling information via the low power channel during idle periods. When the scheduling information is received, the wireless computing device activates its primary channel network interface components to communicate data through the primary channel. When the computing device is idle, the device is configured to power down all of its components with the exception of the circuitry required to power the low power channel. As such, the low power channel is maintained in an active state for receiving scheduling information, such as an access schedule, during both idle and non-idle periods.

15 Claims, 9 Drawing Sheets

U.S. PATENT DOCUMENTS

| | | | |
|---|---|---|---|
| 5,278,831 | A | 1/1994 | Mabey et al. |
| 5,410,738 | A | 4/1995 | Diepstraten et al. |
| 5,519,761 | A | 5/1996 | Gilhousen |
| 5,594,731 | A | 1/1997 | Reissner |
| 5,621,735 | A | 4/1997 | Rochester et al. |
| 5,740,363 | A | 4/1998 | Siep et al. |
| 5,790,536 | A | 8/1998 | Mahany et al. |
| 5,844,893 | A | 12/1998 | Gollnick et al. |
| 5,850,181 | A | 12/1998 | Heinrich et al. |
| 5,898,904 | A | 4/1999 | Wang |
| 5,920,815 | A | 7/1999 | Akhavan |
| 5,949,776 | A | 9/1999 | Mahany et al. |
| 5,960,344 | A | 9/1999 | Mahany |
| 6,243,575 | B1 | 6/2001 | Ohyama et al. |
| 6,278,883 | B1 | 8/2001 | Choi |
| 6,356,192 | B1 | 3/2002 | Menard et al. |
| 6,711,418 | B1 | 3/2004 | Wang et al. |
| 6,807,165 | B1* | 10/2004 | Belcea ........................ 370/347 |
| 2001/0055275 | A1 | 12/2001 | Herrmann et al. |
| 2002/0132603 | A1 | 9/2002 | Lindskog et al. |
| 2003/0198196 | A1 | 10/2003 | Bahl et al. |
| 2003/0203740 | A1* | 10/2003 | Bahl et al. ................... 455/516 |
| 2004/0179469 | A1* | 9/2004 | Attar et al. .................. 370/208 |
| 2004/0181569 | A1* | 9/2004 | Attar et al. .................. 709/200 |
| 2005/0059347 | A1 | 3/2005 | Haartsen |

FOREIGN PATENT DOCUMENTS

| | | |
|---|---|---|
| EP | 1137226 A2 | 9/2001 |

OTHER PUBLICATIONS

Keshav, S., "On the Efficient Implementation of Fair Queueing" *Internetworking, Research and Experience*, vol. 2, No. 3., 157-173 (1991).

Barghavan, V., et al., "Fair Queuing in Wireless Networks: Issues and Approaches", *IEEE Personal Communications Magazine*, pp. 44-53 (Feb. 1999).

Parekh, A.K., et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1993).

Parekh, A.K., et al., "A Generalized Processor Sharing Approach to Flow Control in Integrated Services Networks: The Multiple Node Case", *IEEE/ACM Transactions on Networking*, vol. 1, No. 2, pp. 137-150 (Mar. 1994).

NG, T.S., "Packet Fair Queueing: Algorithms for Wireless Networks with Location-Dependent Errors", *Proceedings of INFOCOM '98, The Conference on Computer Commications* vol. 3, *Seventh Annual Joint Conference of the IEEE Computer and Communications Societies*, pp. 1103-1111 (Mar. 1998).

Benini, L., et al., "System-Level Dynamic Power Management", Low-Power Design, 1999; Proceedings. IEEE ALessandro Volta Memorial Workshop On Como, Italy Mar. 4-5, 1999, Los Alamitos, CA USA, IEEE Comput. Soc. US, Mar. 4, 1999, pp. 23-41.

Benini, Luca et al., "Monitoring System Activity for OS-Directed Dynamic Power Management", In *Proceedings of 1998 ACM ISLPED*, pp. 185-19.

Benini, L. et al., *Dynamic Power Management of Electronic Systems*, in *Proceedings of the 1998 IEEE/ACM ICCAD*, Nov. 8-12, 1998, San Jose CA, pp. 696-702.

Hinckley, K., et al., "Sensing Techniques for Mobile Interaction", *ACM UIST 2000 Symposium on User Interface Software & Technology*, CHI letters 2(2), pp. 91-100.

*Intel Microsoft Toshiba*, "Advanced Configuration and Power Interface", Revision 1.0 Feb. 2, 1999, 323 pages.

Simunic, Tajana, et al., "*Dynamic Power Management for Portable Systems*", In *Proceedings of ACM MOBICOM 2000*, Aug. 2000, Boston, MA pp. 11-19.

Simunic, Tajana, et al., "*Dynamic Voltage Scaling and Power Management for Portable Systems*", In *Proceedings of ACM DAC 2001*, Aug. 2001, pp. 524-529.

Fleishman, Glenn, *New Wireless Standards Challenge 802.11b, The O'Reilly Network*, at oreillynet.com/lpt/a//wireless /2001/05/08standards.html (Jun. 8, 2001), pp. 1-4.

Flickenger, Rob, *802.11B Tips, Tricks and Facts, The O'Reilly Network*, retrieved from oreillynet.com/lpt/a//wireless/2001/03/02/802.11b_facts_.html (Mar. 2, 2001), pp. 1-3.

Press Release, "*Atheros Ships Combo Rolling Three WLAN Standards into a Single Solution*", *Atheros Communication* retrieved from atheros.com/news/combo.html (Mar. 11, 2002) pp. 1-3.

Atheros Communications, *AR5001X Combo WLAN Solution Brochure*, retrieved from atheros.com pp. 1-2.

Nobel, Carmel, *For WLAN, It's 802.11bm Eweek* retrieved from eweek.com/print_article /0.3668.a=18648.00.asp (Nov. 19, 2001) pp. 1-2.

Liu, Jun, et al., "*Using Loss Pairs to Discover Network Properties*", *ACM SIGCOM Internet Measurement Workshop*, 2001, 12 pages.

Zhang, Yin, et al., "*On the Constancy of Internet Path Properties*", *SIGCOM Internet Measurement Workshop*, 2001, 15 pages.

Lai, Kevin, et al., "*Measuring Link Bandwidths Using A Deterministic Model of Packet Delay*", In *Proceedings of ACM SIGCOM 2000*, 12 pages.

Balakrishnan, Hari, et al., "*Analyzing Stability in Wide-Area Network Performance*", In *Proceedings of CAN SIGMETRICS Conference on Measurement & Modeling of Computer Systems*, Seattle, WA Jun. 1997, 11 pages.

Yavatkar, R., et al., "*SBM (Subnet Bandwidth Manager): A Protocol for RSVP-based Admission Control Oveer IEEE 802-style Networks*", *IETF RFC 2814*, retrieved from faws.org/rfcs/rfc2814.html on May 19, 2002.

Breslau, Lee, eet al., "*Endpoint Admission Control: Architectural Issues and Performance*", In *Proceedings of ACM SIGCOMM 2000*, pp. 57-69.

Chiasserini, Carla, F., "*Combining Paging with Dynamic Power Management*", in *IEEE INFOCOM* 2001, pp. 996-1004.

Shih, Eugene, et al., "*Wake on Wireless: An Event Driven Energy Saving Strategy for Battery Operated Devices*", MOBICOM '02, Sep. 23-26, 2002, pp. 1-12.

Yung-Hsiang, Lu, "*Requester-Aware Power Reduction*", *IEEE*, Sep. 20, 2000, pp. 18-23.

Lettieri, Paul, "Advances in Wireless Terminals", *IEEE Personal Communications*, Feb. 1999, pp. 6-19.

Kleynhans, Steve, "*IBM: Back in the PC Game*", retrieved from techupdate.zdnet.com/techupdate/stories/main/0,14179,2868907-2,00html (last visited Sep. 16, 2002).

"*Wayports Successful Trail of Microsoft Windows XP and 802.1x Forecasts a More Secure Environment for Wireless Users*", HITCH Online 2002 edition at online.hitec.org/news/4009856,20000343.htm (last visited Sep. 16, 2002).

"*Wireless LAN Computing with IBM Personal Device*", IBM White papers, IBM Personal Systems Group, Dec. 2001, 9 pages.

Bowman, Barb, "*Unplugged and Unwired*", *Microsoft Corporation* at microsoft.com/windowsxp/expertzone/columns/bowman/june11.asp (last visited Sep. 16, 2002).

"*Windows XP Segment Analysis of the IBM ThinkPad Notebook Platform*", Strategic Relationship Marketing Oct. 2001, 1 page.

*Boingo Launches Nationwide WI-FI Service*, Boingo Press Releases at boingo.com/pr/pr3/html (last visited Sep. 20, 2002).

*Boingo Wireless Announces Founding and Funding*, Boingo Press Releases at boingo.com/pr/pr1/html (last visited Sep. 20, 2002).

*802.11b has reached 'escape Velocity* Boingo Wireless Market Overview at boingo.com/marketoverview.html (last visited Sep. 20, 2002).

Chan, Sharon Pian, *Wireless where you want: WI-FI is the guerrilla revolution of wireless computing*, Seattle Times Wireless where you want it at seattletimes.nwsource.com/htm/businesstechnology/134402814wirelesslan11.html last visited Sep. 20, 2002.

*Wireless Technology, Wireless Technology* at microsoft.com/hwdev/wireless (last visited Dec. 8, 2000).

Lough, Daniel, L., et al., *A Short Tutorial on Wireless LANs and IEEE 802.11* at computer.org/students/looking/summer97/ieee8702.htm (last visited Dec. 12, 2000), 5 pages.

Mubashir, Alam, *Descriptive Analysis of IEEE 802.11 Standard for Wireless Networks*, at triton.cc.gatech.edu/ubicomp.257 (last visited Dec. 12, 2000).
*Zero Configuration Networking (zeroconf)* at zeroconf.org (last visited Dec. 12, 2000).
Cheshire, Stuart, "Dynamic Configuration of IPv4 Link-local Addresses", Apple Computer Oct. 8, 2000 at zeroconf.org/draft-ietf-zeroconf-ipv4-linklocal-00.txt (last visited Dec. 12, 2000).
Hattig, M., *Zeroconf Requirements draft-ietf-zeroconf-reqts-06.txt* (Dec. 12, 2002).
"Enabling IEEE 802.11 Networks with Windows "Whistler"", at microsoft.com/hwdev/wireless/ieee802Net.htm (last visited Dec. 8, 2000).
*Specification of the Bluetooth System*, vol. 1, Dec. 1, 1999, pp. (1,082 pages).
Miller, Brent, et al., Mapping Salutation Architecture APIs to Bluetooth Service Discovery Layer (White Paper), vol. 1.0, IBM Corporation, Jul. 1, 1999, pp. (pp. 1-26).
*IEEE Standard, 802.11, Part 11: Wireless LAN Medium Access Control (MAC) and Physical Layer (PHY) Specifications*, 1st Edition 1999 (512 pages).
O'Hara, Bob, et al., *IEEE 802.11 Handbook A Designer's Companion*, Dec. 1999, (174 pages).
Rigney, C., et al., "*Remote Authentication Dial in User Service (Radius)*", The INternet Society, Jun. 2000, (pp. 1-59).
Aboda, B., et al., RFC 2716, "*PPP EAP TLS Authentication Protocol*". The Internet Society, Oct. 1999, (pp. 1-19).
Blunk, L., et al., RFC 2284, PPP Extensible Authentication Protocol (EAP), The Internet Society, Mar. 15, 2000, (pp. 1-12).

IEEE 802.11 Security White Paper, vol. 1., Windows Network Infrastructure team, Microsoft Corporation, Mar. 15, 2000, pp.
IEEE 802.1X Supported Scenarios, Windows Network Infrastructure team, Microsoft Corporation, vol. 1, Apr. 7, 2000, (7 pages).
Mettala, Riku, et al., "*Bluetooth Protocol Architecture*" (White paper), vol. 1.0, Nokia Mobile Phones, Sep. 29, 1999.
Muller, T., *Bluetooth Security Architecture*, (White paper), vol. 1.0, Jul. 15, 1999.
Chunlong Guo et al., *Low Power Distributed MAC for AD Hoc Sensor Radio Networks*, IEEE Online! 2001, pp. 2944-2948, XP002316297, no month listed.
Intel: *Sample Installation Scenarios*, Intel Wireless Gateway, 'Online! Oct. 9, 2001, pp. 103, XP002316298.
Olofsson et al., "*Performance Evaluation of Different Random Access Power Ramping Proposals For The WCDMA System,*", Proceedings of PIMRC '99: International Symposium on Personal and Indoor Mobile Radio Communications Sep. 12-15, 1999 Osaka, Japan, Online! vol. 3, Sep. 12, 1999, pp. 1505-1509, vol. XP002317518 10th International Symposium on Personal, Indoor and Mobile Radio Communications (PIMRC'99). Proceedings Osaka Univ Odsaka; s3.kth.se/radio/COURSES/OPACKETRADIO$_{13}$2E5503$_{13}$2004/Slides/PIMRC99$_{13}$RA.pd.
Jorgen Bach Andersen: "*Antenna Arrays in Mobile Communications: Gain, Diversity, and channel Capacity*" IEE Antennas and Propagation Magazine, vol. 42, No. 2, Apr. 2000; pp. 12-16, XP002334673.

* cited by examiner

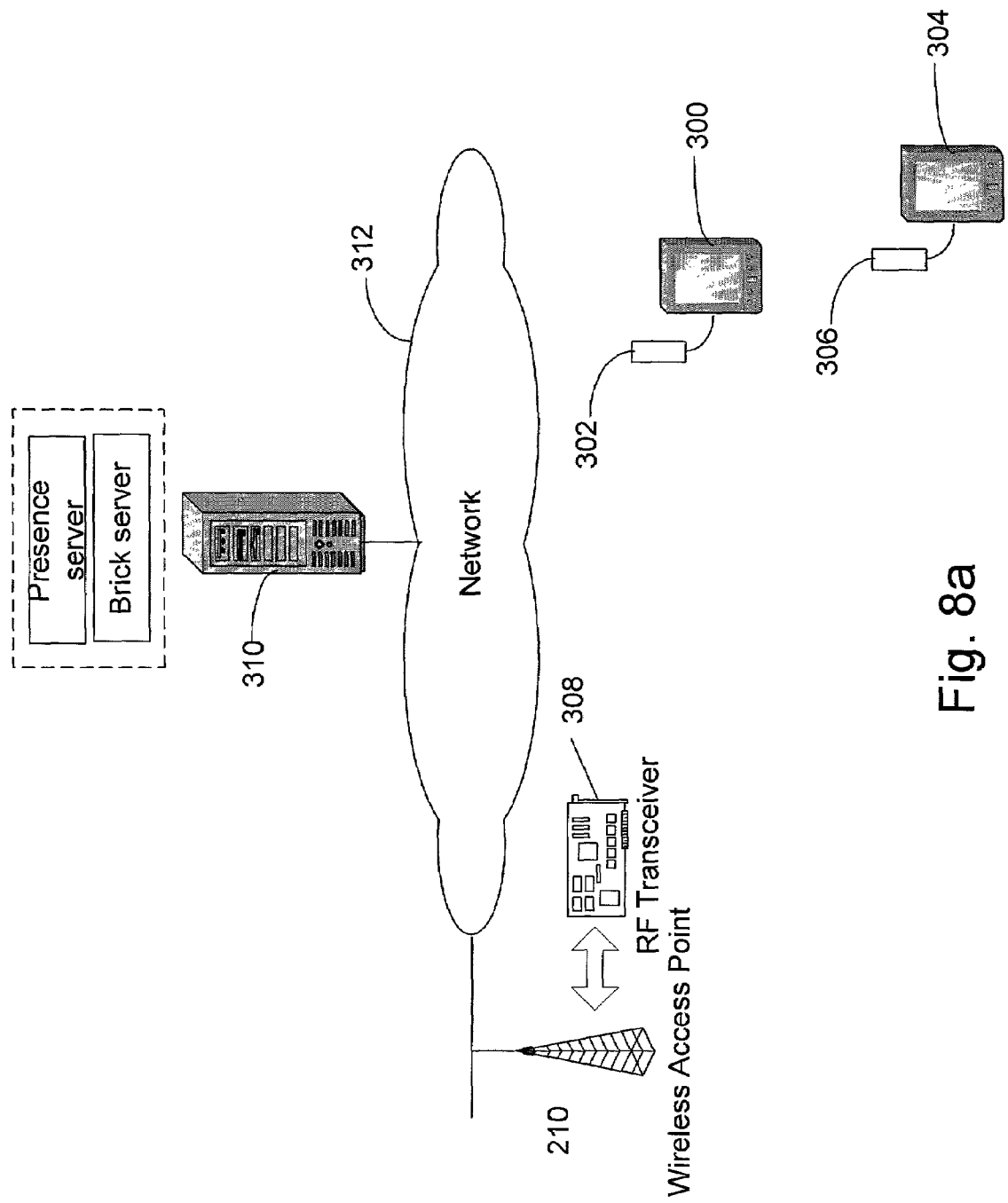

POWER EFFICIENT CHANNEL SCHEDULING IN A WIRELESS NETWORK

TECHNICAL FIELD OF THE INVENTION

The present invention relates generally to wireless computing devices, and more particularly, to power efficient channel access scheduling for wireless computing devices using multiple radios.

BACKGROUND OF THE INVENTION

Many wireless computing devices, such as laptop computers, personal digital assistant devices, etc., may act as client devices in a wireless networking environment. Often these multiple clients all communicate via the network through shared radio frequency channels to a shared access point. However, when a large number of such client devices attempt to access the network, this sharing of network access points often leads to congestion and a wasting of bandwidth. Congestion often leads to collisions in the channel between data signals and hence to delay.

To overcome these challenges, various control techniques have been implemented with respect to wireless networks to aid in scheduling to avoid collisions. For example, clients may engage in listen-before-transmit ("LBT") mechanisms, such as the CSMA-CA channel access mechanism, vying for space in the shared channel before transmitting. LBT techniques are a type of distributed coordinated function. CSMA-CA is a particular Ethernet LAN access method. However, with all LBT schemes, if one client device is currently transmitting signals (i.e. data packets) in the channel, other senders are forced to back off and wait a random amount of time before attempting access again. Additionally, even if the client devices detect that the network is free, two such devices may access the channel at exactly the same time, causing a signal collision. When this type of collision is detected, both client devices are forced to back off and wait a random amount of time before attempting transmission again. While the client devices are waiting, channel bandwidth is wasted, packet transmission is delayed, and battery power on the client machine is wasted.

Other mechanisms exist for aiding in scheduling and avoiding collision between data signals over a shared channel. Another example is a point-coordinated function ("PCF"), which repeatedly polls the client devices in order to avoid collisions of signals. However, while PCF techniques avoid the constant back and forth between the competing data signals, the constant polling on the primary channel wastes a large amount of bandwidth, thus making this technique highly inefficient.

While current wireless channel access techniques do produce collision avoidance, they also waste bandwidth on the primary channel used to send data packets because these techniques use the channel both to transmit control and scheduling information and to send useful data. Distributed coordinated functions, such as CSMA-CA, are further inefficient for real-time data because of the forced waiting period. Real-time audio data may no longer be useful, or sufficient, after a forced delay, such as a 100-millisecond delay. Additionally, there is no guarantee of channel access by any of these techniques and there is no mechanism to assure that high priority data signals are transferred in a timely manner.

However, if the access point knows the exact state of every client it is servicing (e.g. number of packets pending in the queue, the packets deadlines, and packet priorities), it can schedule each client independently on the channel. While researchers have attempted to build true work conserving fair queuing algorithms based upon this premise, these algorithms have not been truly work conserving because part of the bandwidth on the channel is used up in transmitting control information to the scheduler and in many cases the media-access control (MAC) protocol has to be changed. Therefore, even with such techniques bandwidth is wasted.

Additionally, while largely avoiding signal collisions, these techniques cause inefficient use of power because they often use a high-powered channel to send control data in addition to useful data. A particular component of a wireless device that consumes a significant amount of power is the network interface card (NIC), which handles the wireless transmission and reception of network communication data. It has been estimated that on average, about 20% of the total power available to a wireless device is dissipated as a result of the connection of a NIC, or other wireless LAN interface component. This phenomenon is due to the fact that the NIC and wireless device must be in a constant "listening" state in order to receive and transmit data via the network. Since the amount of power a battery can provide is rather limited, minimizing the power consumption of a mobile device in order to extend its operation time is an important consideration in the design of battery operated wireless devices, and any communication systems involving such devices.

SUMMARY OF THE INVENTION

To address the challenges described above, a method and system are disclosed for power efficient channel scheduling of wireless client devices in a wireless network using multiple radios. This method and system lead to optimum use of channel bandwidth and power in wireless computing devices. Therefore, true work conserving algorithms can be implemented. Such wireless computing devices include, but are not limited to, personal data assistants ("PDAs"), cellular phones, and laptop computers having network interface capabilities.

In accordance with an embodiment of the invention, a wireless computing device enables a low power control channel to exchange information including control information for a network interface card (NIC), and other power consuming components of the computing device, with a host transceiver, referred to as a smartbrick. Initially, the low power transceiver registers with the host transceiver, such as a host transceiver located at a network wireless access point. The low power transceiver operated by the wireless computing device then sends control information data signals to the host transceiver. This information may be, but is not limited to, state information, the number of data packets in a queue, the packet priority, and/or packet deadline. The host transceiver then responds by transmitting scheduling information back to the low power transceiver. This scheduling information may include, among other things, channel access information.

Prior to receiving scheduling information from a host transceiver component, the high power wireless network interface components, such as associated with an ordinary wireless NIC, are idle. Idle periods are periods when a low power state of operation is employed by the wireless computing device, or periods when no substantive network activity (e.g., sending or receiving of data) is being engaged in by the wireless computing device via its high frequency communication channel (e.g., IEEE 802.11 based channel). After receiving the scheduling information on the low power control channel, the full power NIC and necessary circuitry are automatically activated consistent with the scheduling information. For example, in one embodiment, upon receiving channel access information, such as a message that the channel is free for transmission, the NIC and other components of the wireless computing device are powered up. The network interface component, such as the NIC, then transmits or receives data over the high power channel.

The low power control channel is implemented via an internal or external radio frequency (RF) transceiver component, referred to as a minibrick, which preferably operates at a low frequency (such as lower than that of the full power NIC) and low power level. In operation, when the computing device is idle, the device is configured to power down substantially all of its components with the exception of the circuitry required to power the low power transceiver. As such, the control channel is maintained in an active state for receiving signals during both idle and non-idle periods.

In accordance with another embodiment of the invention, the smartbrick is implemented as a host transceiver that operates at a host computer, or network access point, to communicate with the minibrick. The host computer may also be equipped with an IEEE 802.11 based NIC for supporting wireless communication to access the network through a wireless access point (AP). The wireless AP acts as an interface to a network infrastructure, such as a wired enterprise LAN. When a requesting device wishes to communicate with a wireless computing device, it queries a server in order to determine the location and presence of the wireless computing device. In response, the server submits the query to the host computer. The smartbrick operating on the host computer receives the query from the server, and communicates with the minibrick via the low power channel to begin scheduling and operation of full power communications. The wireless computing device receives this signal and powers up the NIC and other components accordingly, resulting in activation of the wireless device prior to any actual transmission of data by the requesting device.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention and its advantages may be best understood from the following detailed description taken in conjunction with the accompanying drawings, of which:

FIG. 8a is a schematic diagram illustrating a networked environment wherein the multiple wireless network devices vying for channel space are out-of-range of the wireless access point.

DETAILED DESCRIPTION OF THE INVENTION

The invention relates to a method and system for traffic handling of computing devices that are capable of communicating over a wireless link. Wireless computing devices usable within embodiments of the invention include, but are not limited to, personal data assistants, cellular phones, and laptop computers having wireless network interface capabilities. In the context of the invention, wireless communication is the transmission of data between computing devices using radio frequency (RF) and electromagnetic waves rather than wires. To facilitate wireless communication, a computing device may be equipped with a network interface component, such as a network interface card (NIC) that interfaces the device to the network. Typically, the NIC is implemented as a plug and play device that can be inserted into a network card slot of the computing device or that can be otherwise interfaced to the device. Alternatively, the NIC can be built integrally as part of the circuitry of the computing device.

To facilitate wireless communication, the NIC supports a wireless protocol, such as pursuant to the IEEE 802.11 standard. General reference will be made throughout the course of this description to 802.11 as a suitable protocol for facilitating wireless communication between devices. However, those skilled in the art will recognize that 802.11 is only one protocol for facilitating wireless communication, and that the invention is not limited to any particular wireless protocol. Indeed, other wireless protocols may be utilized alternatively or additionally in connection with the invention. It will also be recognized by those skilled in the art that the designation 802.11 refers to other protocols within the same family, including 802.11a, 802.11b or 802.11g.

Figure 1:
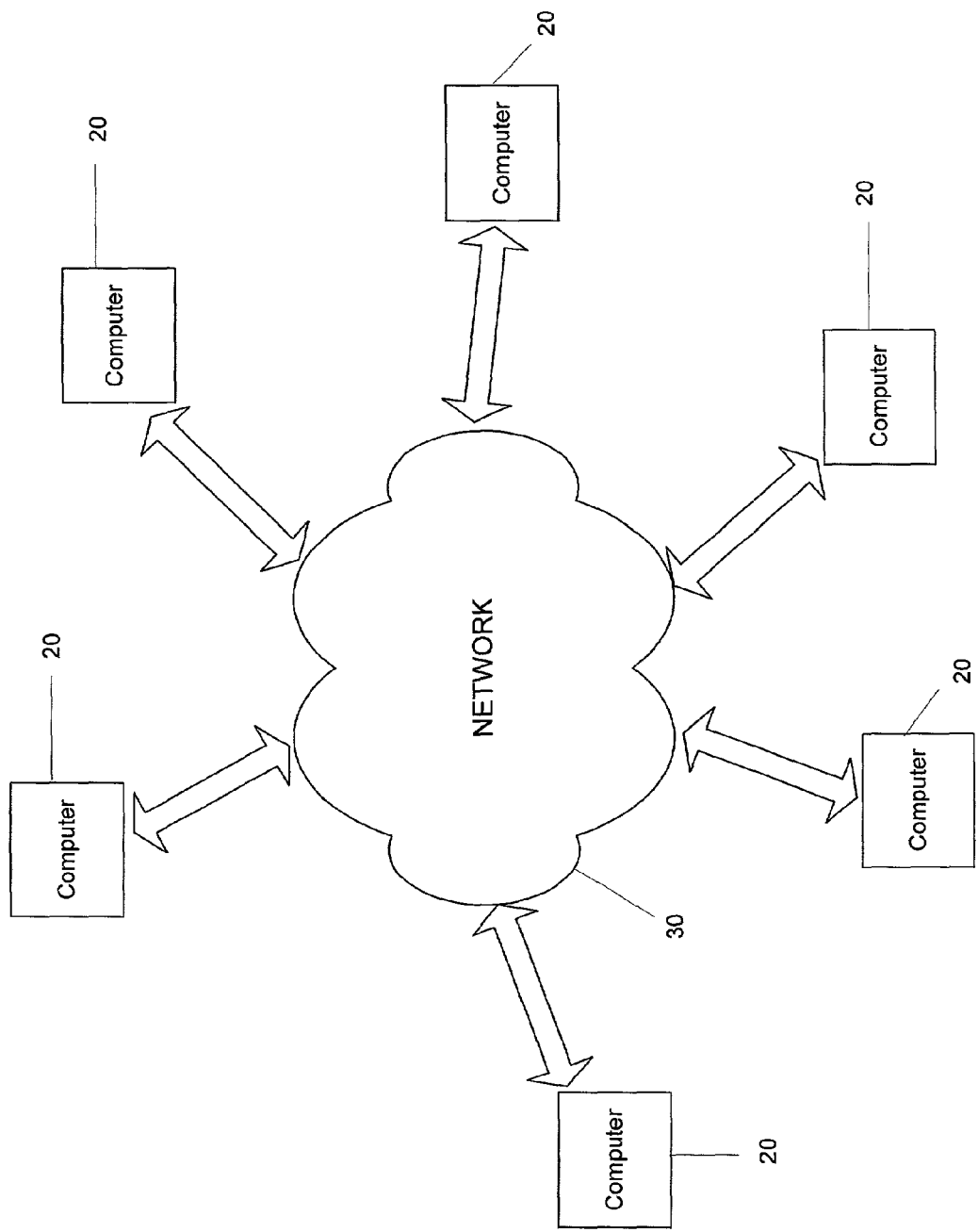
FIG. 1 is a schematic diagram of an exemplary computer network within which embodiments of the invention may be implemented.

An example of a networked environment in which the invention may be used is shown in FIG. 1. The example network includes several computing devices 20 communicating with one another over a network 30, such as the Internet, as represented in the figure by a cloud. Network 30 may include one or more well-known components, such as routers, gateways, hubs, etc. and may allow the computers 20 to communicate via wired and/or wireless media.

Figure 2:
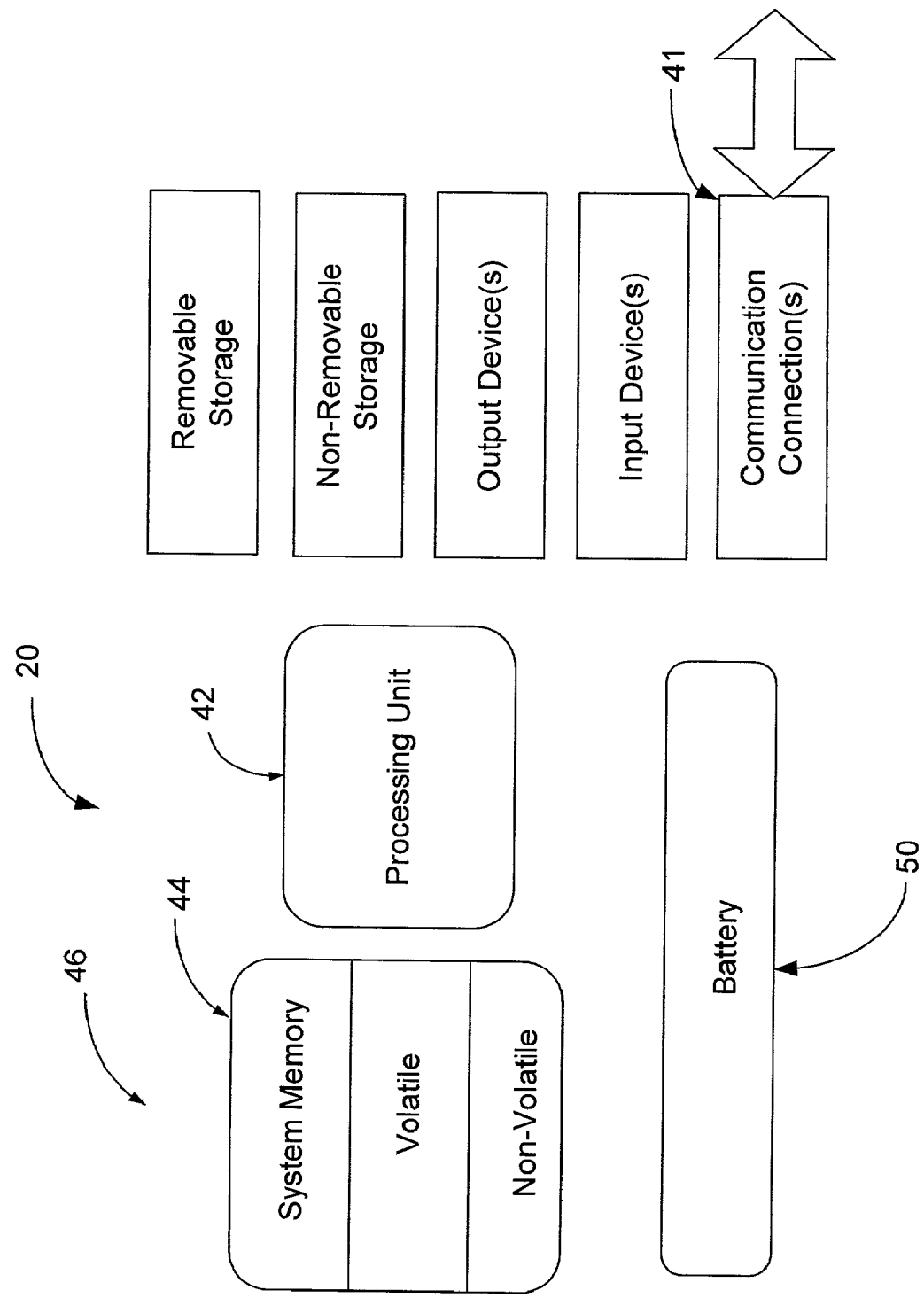
FIG. 2 is a schematic diagram illustrating the architecture of an exemplary computing device in which an embodiment of the invention may be implemented.

Referring to FIG. 2, an example of a basic configuration for a computing device on which the system described herein may be implemented is shown. In its most basic configuration, the computing device 20 typically includes at least one processing unit 42 and memory 44 although such is not required. Depending on the exact configuration and type of the computing device 20, the memory 44 may be volatile (such as RAM), non-volatile (such as ROM or flash memory) or some combination of the two. The most basic general configuration is illustrated in FIG. 2 by dashed line 46. Additionally, the computing device may also have other features/functionality. For example, computer 20 may also include additional data storage components (removable and/or non-removable) including, but not limited to, magnetic or optical disks or tape. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computing device 20. Any such computer storage media may be part of the computing device 20.

The computing device 20 also preferably contains communication connections 48 that allow the device to communicate with other devices. A communication connection is an example of a communication medium. Communication media typically embodies readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

A computing device 20 may also have input devices such as a keyboard, mouse, pen, voice input device, touch input device, etc. Output devices such as a display 48, speakers, a printer, etc. may also be included. Furthermore, for wireless mobile devices, the computing device 20 is preferably provided with a portable power source 50, such as a battery pack, fuel cell or other power module. The power source 50 acts as a primary source of power for computations and wireless data transmissions to be performed by the device. All the aforementioned components and features are well known in the art.

The device 20 preferably supports an operating system, for example stored in nonvolatile memory and executed by the processing unit 42 from volatile memory. According to an embodiment of the invention, the operating system contains instructions for interfacing the device 20 to a full power wireless network and to a low power wireless network. In this manner, scheduling information usable to schedule access of the device 20 to the full power wireless network may be sent over the low power wireless network, saving device power and saving bandwidth in the full power channel, according to the techniques to be more fully discussed elsewhere herein.

A device, component or group of components may be described herein as "powered up" when the relevant device, component or group of components is in an "ON" state of operation, e.g. operating, or at least receiving power and immediately ready to operate, in its ordinary mode of operation. Conversely, when a device, component or group of components is described as being "powered down," the relevant device, component or group of components is not operating in its ordinary mode of operation, and is not receiving power and immediately ready to operate in its ordinary mode of operation.

Figure 3:
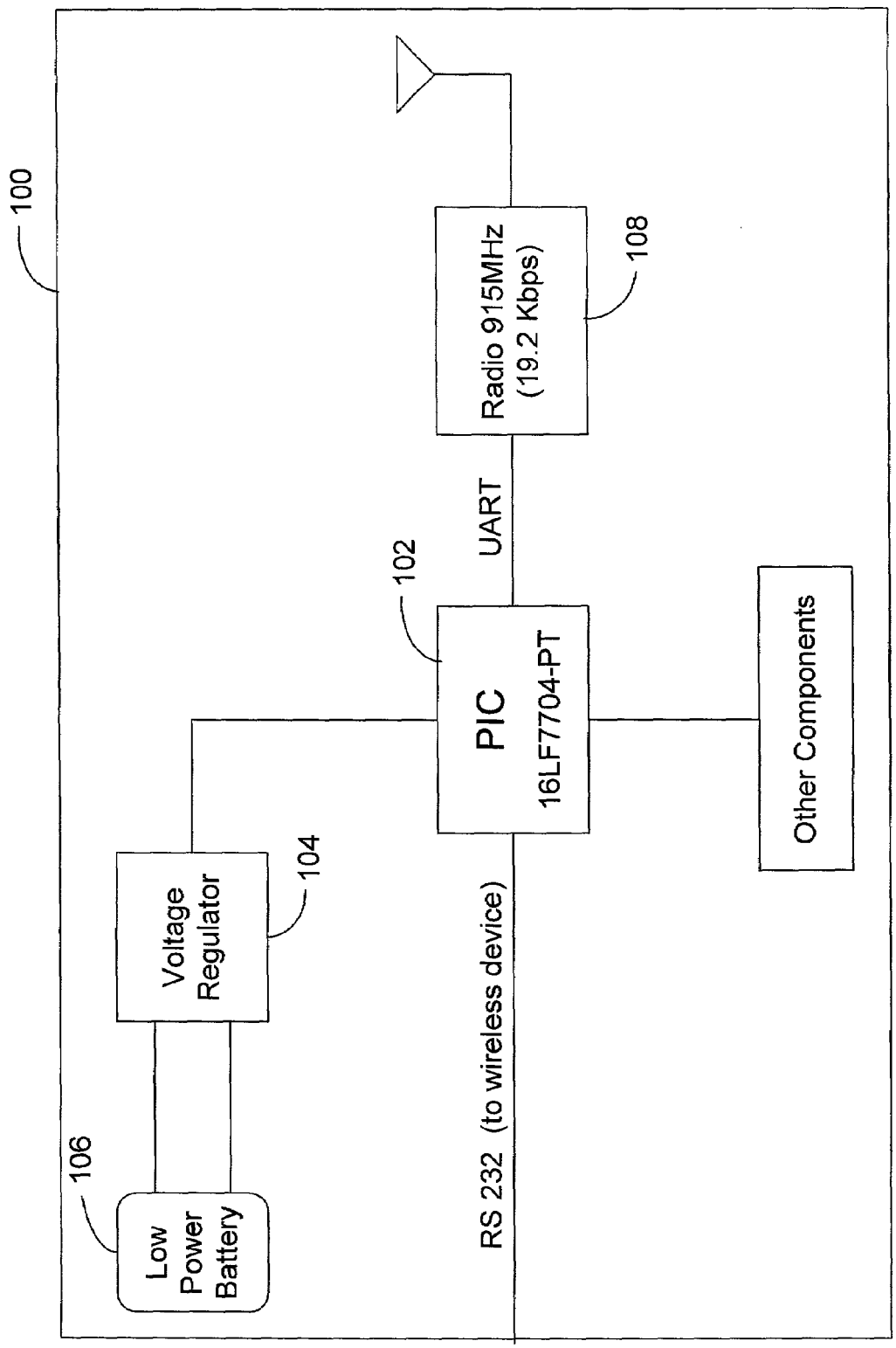
FIG. 3 is a schematic diagram illustrating an architecture of a transceiver component operated by a computing device for maintaining a low power control channel in an embodiment of the invention.

In accordance with an embodiment of the invention, the computing device 20 is further equipped with a low power transceiver component 100 for maintaining a RF control channel, as illustrated in greater detail in FIG. 3. The low power transceiver component, referred to as a minibrick 100, is comprised of various components for the receipt and transmission of data, including a logic device 102 for controlling the operation of the transceiver and for affecting the operation of the computing device 20 in response to various network events. Also preferably included is a voltage regulator 104 for adapting the voltage output of a low power battery unit 106. The low power battery unit 106 is suitable for powering the transceiver using minimal power, and can operate independently of the portable battery source 50. Alternatively, the primary battery source 50 may be used to implement the same function as a low power battery unit 106. The low power transceiver 100 also includes a radio frequency (RF) generator 108 for generating and providing radio frequency signals for transmission. Other elements 109 for implementing or enhancing the transceiver functions may also be included as part of the low power transceiver circuitry and described elements may be altered or replaced.

Physically, the low power transceiver 100 can be implemented as an internal component of the computing device 20, such as by integrating it with the primary circuitry of the computing device 20, or it can be connected to the computing device via a peripheral connection, such as an RS232 connection (e.g., the input channels 41). Also, the low power transceiver 100 is configured to support a control channel for receiving and sending data via the radio component 108. Exemplary operating characteristics for the low power transceiver 100 for implementing the low power control channel are shown in TABLE 1.

| Data Rate | 19.2 Kbps |
|---|---|
| Modulation | OOK |
| Voltage | 3 V |
| Receiver Current | 4.5 mA |
| Peak Radio Output Power | 0.75 mW |

TABLE 1: Example Operational Characteristics for the Lower Power Transceiver 100.

As illustrated, the various characteristics of the low power transceiver 100 result in the generation of a low power, and preferably low frequency data communication channel at 915 MHz, supporting a data rate of 19 Kbps, which is substantially less than that of standard wireless NICs. Conventional NICs, such as those based on the IEEE 802.11 standard, operate at much higher data rates ranging approximately from 1–20 Mbps. Because of the higher data rates and ranges associated with standard NICs, the power consumption for powering pu the standard NIC is also higher. The low power transceiver 100, however, requires less power to operate, and is configured to remain active even during powered off states of all or some of the rest of the wireless computing device 20. While not limited to the operating characteristics of TABLE 1, the low power transceiver is suitable for generating and receiving RF signals without requiring significant power usage by the device. For an explanation of other features and aspects of the enhanced two-radio network device, please see U.S. patent application Ser. No. 10/124,737, entitled Reducing Idle Power Consumption in a Networked Battery Operated Device, filed April, 2002, which is herein incorporated by reference in its entirety for all that it discloses.

Figure 4:
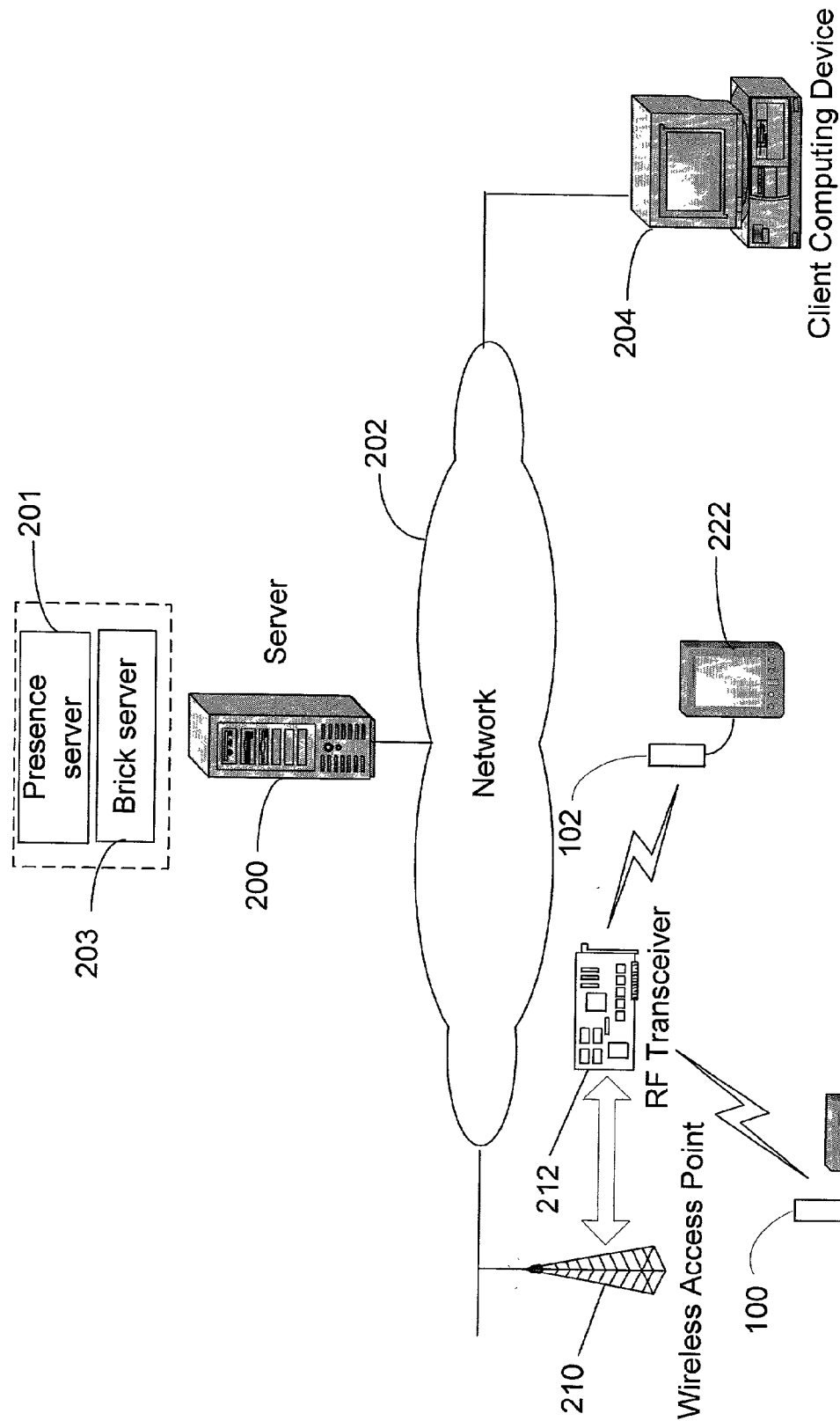
FIG. 4 is a schematic diagram illustrating an exemplary operating environment for optimum channel scheduling through a low power control channel according to an embodiment of the invention.

Referring now to FIG. 4, an exemplary network environment within which a wireless computing device, such as the device of FIGS. 2–3, may operate is shown in accordance with an embodiment of the invention. The exemplary network includes a server 200, which interfaces with a computer network 202 and manages various network resources including a Brick Server 203 and a presence server 201. The Brick Server 203 and presence server 201 operate at the server 200 to facilitate specific network tasks. In particular, the presence server maintains a list of clients that are registered with the network server 200 in order to have their state of presence maintained. Presence data or information is any data received over the network that describes the availability, proximity, location, activity level or operating state of a computing device or corresponding user of a device. By registering with the server 200, client devices connected to the network 202 may query the presence server 201 to detect the presence of other devices. Similarly, the Brick Server 203 maintains and manages presence information pertaining to one or more low power transceivers or host transceivers, which are low power transceiver components used to implement a low frequency control channel within the network infrastructure. The operation of the host transceiver and low power transceiver within the network environment will be described in greater detail hereinafter.

While maintaining network resources, the server 200 facilitates communication for one or more computing devices that communicate over the network 202. A first client device 204 is configured to the network 202 through a wired connection (e.g., T1 line, modem) or wireless connection. The access point 210 acts as an intermediate device between a second client device, such as wireless computing device 220, and the network 202. Additionally, logically connected to the access point 210 is a host transceiver 212, which generates radio frequency signals for communicating with low power transceivers 100 and 102. In an alternative embodiment of the invention, illustrated in FIG. 6, the host transceiver 212 is logically connected to a host computing device configured through a wireless connection. In particular, the host computing device 206 connects to the network 202 through a wireless connection 208 (e.g., 802.11 connection) to the wireless access point 210. The access point, in this embodiment, may act as an intermediate device between the host computing device 206 and the network infrastructure 202. Note that the aforementioned architectures are exemplary and that any other link that comprises a low power RF link may be used to interface a device, such as devices 220 and 222, to any access controlling entity, such as access point 210 within the invention.

Figure 6:
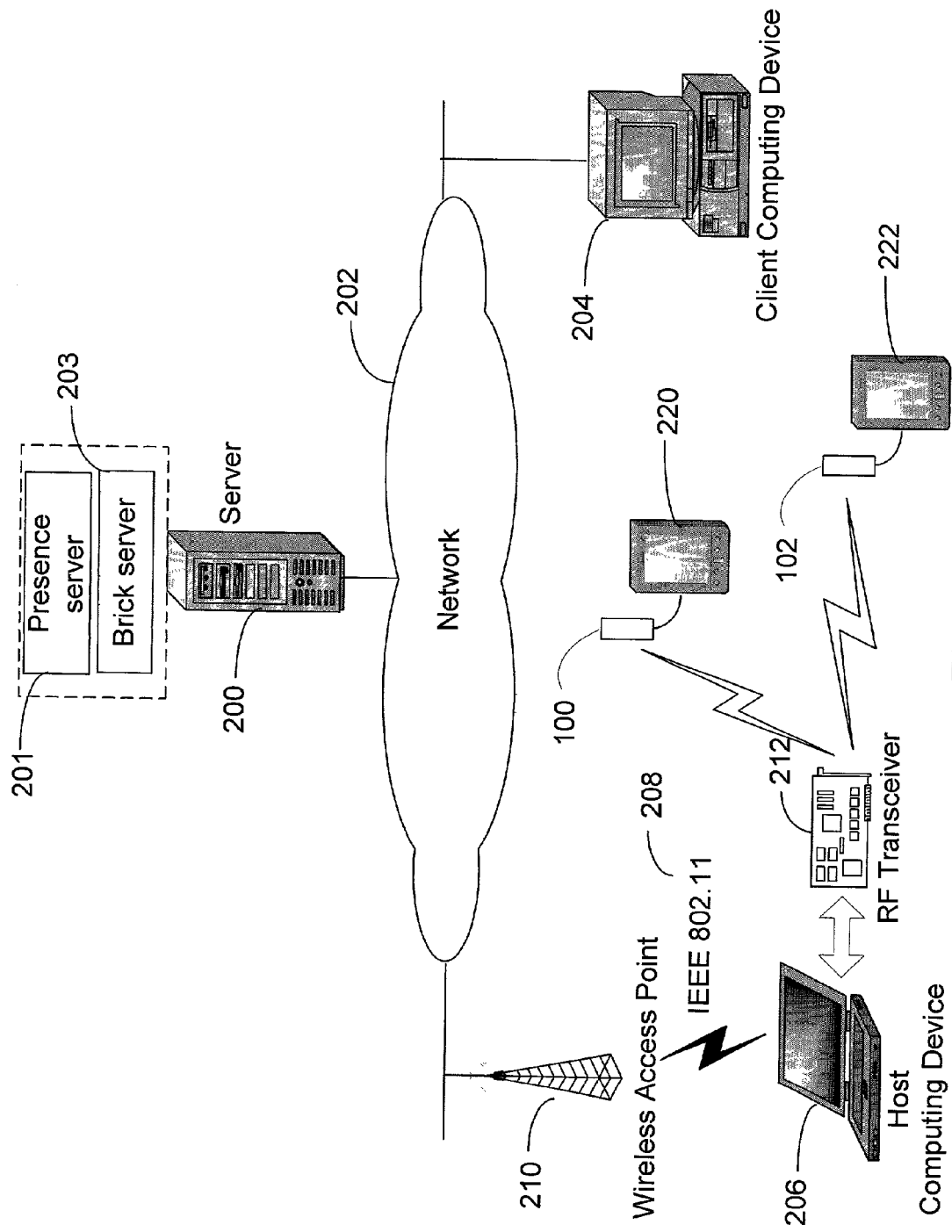
FIG. 6 is a schematic diagram illustrating an operating environment for optimizing channel scheduling wherein the host transceiver is logically connected to a host computer according to an embodiment of the invention.

The host transceiver 212 registers with the Brick Server 203 maintained by the server 200 in order to report its presence. When the host transceiver is connected to the network via a host computing device 206, as illustrated in FIG. 6, it is able to detect, when needed, the occurrence of various network events, such as, for example, the transmission of a message to the host computing device 206, an update to presence information maintained by the Brick Server 203, the transmission of messages intended for transmission by the access point 210, and any other statistics relative to the performance of the network 202.

In accordance with an embodiment of the invention, multiple wireless computing devices operating low power transceivers 100 and 102 communicate with the host transceiver 212 via a low power control channel, as illustrated in FIG. 4. The wireless computing devices are handheld devices 220 and 222 having wireless computing capabilities. Low power transceivers 100 and 102 are coupled to the wireless computing devices 220 and 222 for providing low power, preferably low frequency control channels. The low power transceivers 100 and 102 are enabled to remain powered up even during inactive or idle periods when the components of the wireless computing devices 220 and 222 (other than the circuitry required for the low power transceiver 100 and 102) are wholly or substantially powered off. Preferably, the low power transceivers 100 and 102 are capable of activating the wireless computing devices 220 and 222 (e.g. transferring them from an inactive or idle state to an active or non-idle state) in response to the receipt of scheduling information, such as channel access information.

To enable either low power transceiver 100, 102 to engage in communication over the low power control channel, the low power transceivers 100 and 102 first register with the Brick Server 203 maintained by the server 200. A user of either wireless computing device 220, 222 can enable the registration process manually, such as by running a network application on either device 220, 222 that engages the registration process. Alternatively, the registration process can be performed without user intervention through a simple communication scheme engaged in by the host transceiver 212 and either low power transceiver 100, 102, as described below.

To determine whether a low power transceiver exists within radio range and requires registration, the host transceiver 212 periodically broadcasts beacon or detection signals indicating that the host transceiver is within a suitable range for engaging in communication via the low power control channel. This periodic detection signal is sent preferably when the host transceiver 212 is not transmitting other types of control signals or data. When the appropriate low power transceiver 100, 102 operating at the appropriate wireless computing device 220, 222 detects the detection signal, the low power transceiver 100, 102 generates and sends a message to the host transceiver 212 indicating that it is within low power radio range of the host transceiver 212. Upon receiving such a message, the host transceiver 212 determines its capability to "manage" the relevant low power transceiver 100, 102, and replies to the low power transceiver 100, 102 with an acknowledgement message when appropriate. The host transceiver's 212 ability to manage a specific low power transceiver 100, 102 may be based on the current situation at the access point, including, but not limited to, the number of clients currently vying for channel access. A response acknowledgement is subsequently generated and sent to the host transceiver 212 by the low power transceiver 100, 102, which results in an association (connection or link) between the host transceiver 212 and the relevant low power transceivers 100, 102. Having established an association between the host transceiver 212 and both low power transceivers 100 and 102, the host transceiver transmits a message to the presence server 201 to inform the server of the presence of the low power transceivers 100 and 102. The connection to each low power transceiver will be made prior to coordinated scheduling, but each connection may be established independently at any time without occurring simultaneously with or in a fixed relationship to any other connection.

Regardless of the method of registration performed, be it as described above or by way of another technique, the wireless computing devices 220 and 222 operating the low power transceivers 100 and 102 must be within a range suitable for receiving low power signals from and transmitting low power signals to the host transceiver 212. This range will vary based upon the specific design characteristics of the low power transceivers 100 and 102 and host transceiver 212. Since the messages passed between the low power transceivers 100 and 102 and host transceiver 212 (e.g., acknowledgement messages) are transmitted over the low power, low bandwidth, control channel, and not a primary communication channel (e.g. an 802.11 channel) the standard high power NIC cards of the wireless computing devices 220 and 222 need not be used for facilitating the presence detection and registration process, resulting in less power usage by the devices. Also, because the registration process is executed via a low power control channel rather than the high power channel, the wireless computing devices 220, 222 operating the low power transceivers 100, 102 need not be powered up during the registration.

In an embodiment of the invention, the low power control channel of any device may be idled during non-idle periods of operation by the wireless computing devices 220 and 222 for reducing power consumption. Thus, for example, when a standard wireless NIC card is active on a computing device for facilitating communication between the wireless computing device and the network 202, the low power transceiver 100 can be powered down or placed into a nominal power mode (e.g., sleep mode of operation) wherein no transmissions or received signal processing is performed. Once the standard NIC of the wireless computing device is placed in a low power state of operation or becomes idle, the low power transceiver can be powered up to resume its normal operation on the device. In this way, there is no substantial concurrent power usage by the wireless computing device in maintaining both the standard NIC and the low power transceiver in a powered up state.

Figure 5:
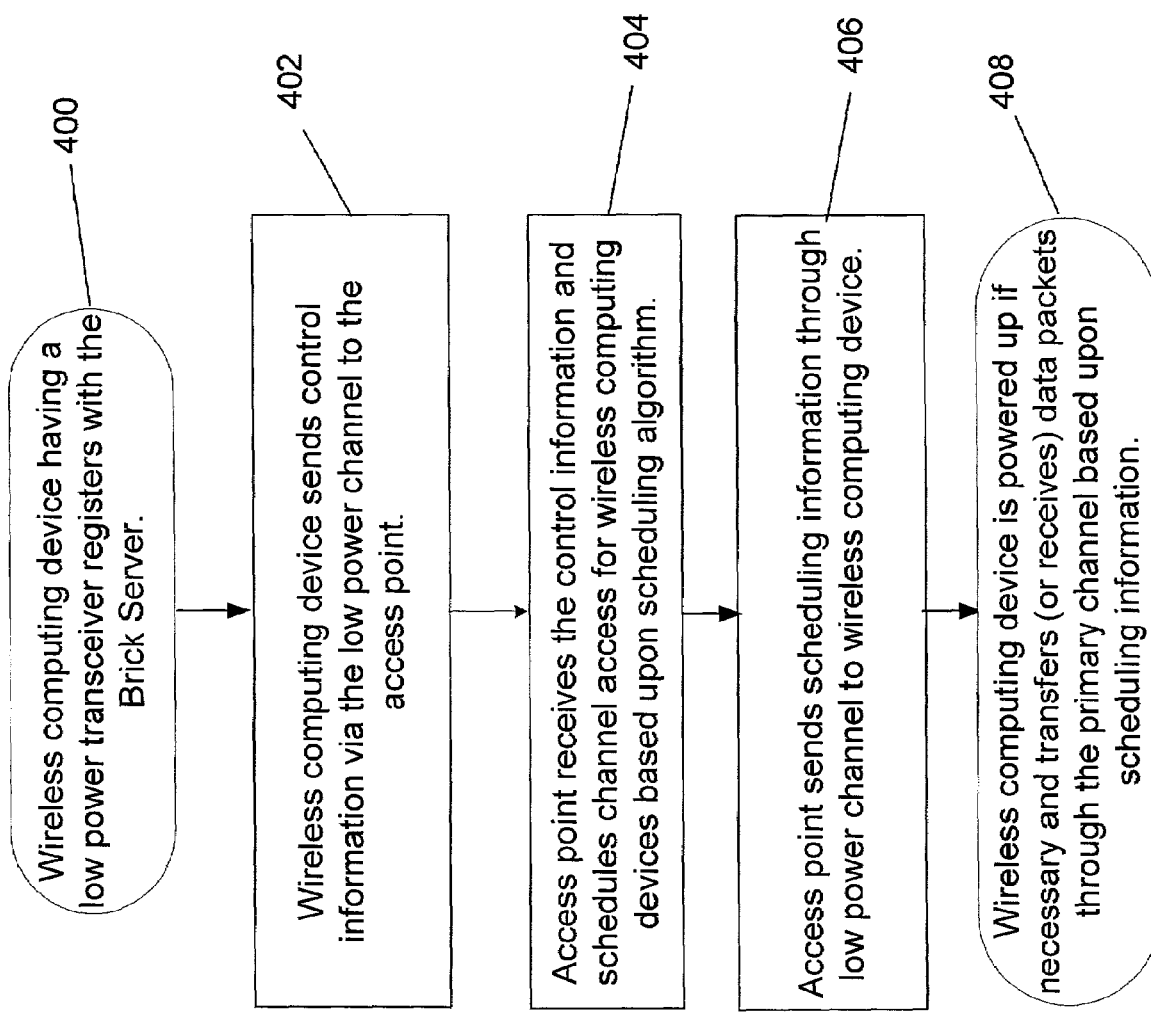
FIG. 5 is a flowchart illustrating the operation of a host transceiver for communicating with a wireless computing device via a low power control channel according to an embodiment of the invention.
Figure 7:
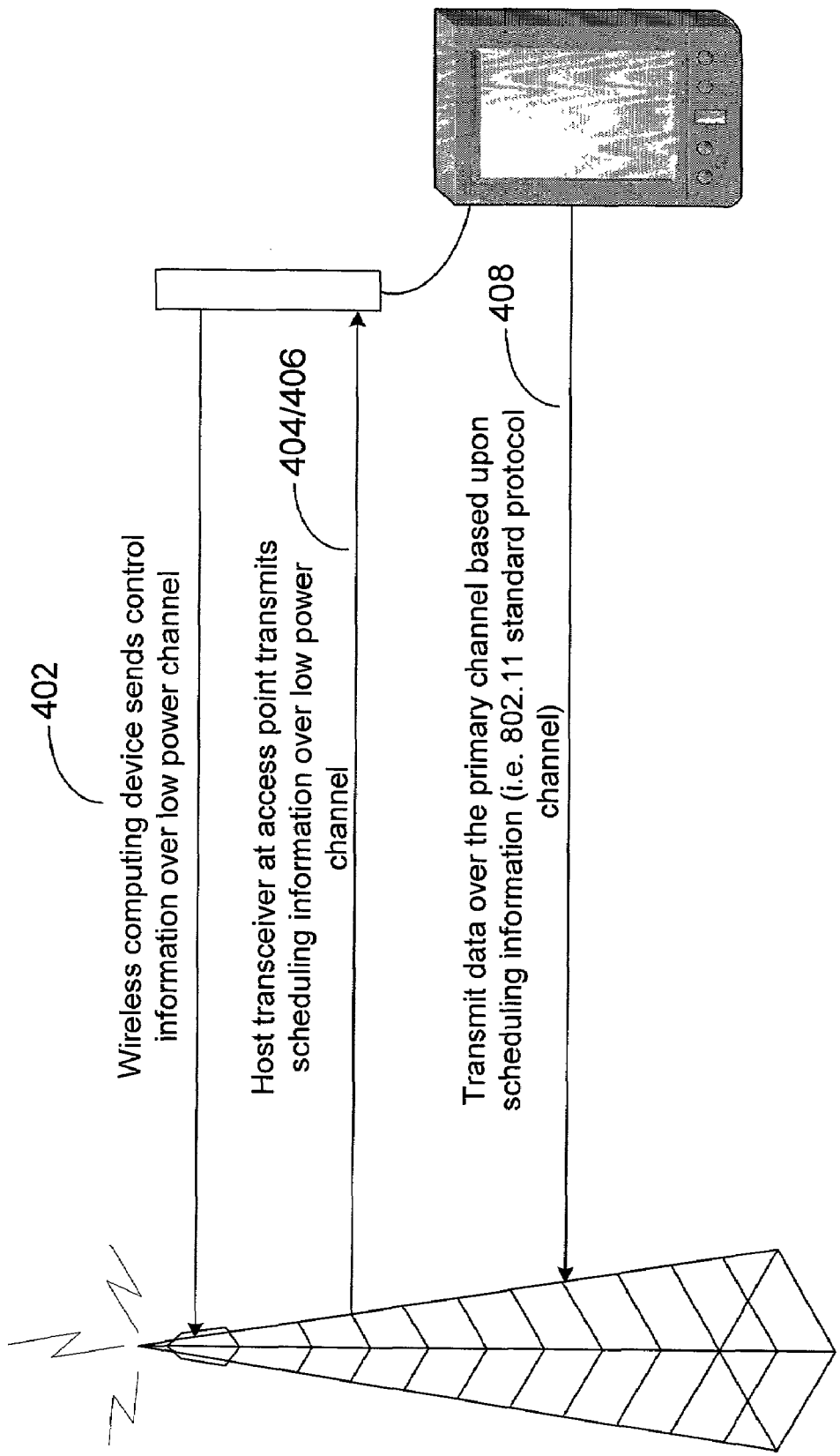
FIG. 7 is a channel diagram illustrating bi-directional communications in a two-channel system.

When numerous wireless computing devices attempt to access the network 202 via the access point 210, data transfer congestion often results. That is, when multiple wireless computing devices, such as devices 220 and 222 contend for the bandwidth of the same access point, one or more devices may experience unacceptable delay, or denial of service. In one embodiment of the invention, illustrated by the flow chart in FIG. 5 and the schematic illustrated in FIG. 7, multiple wireless computing devices vying for communication bandwidth at an access point will have their access to the channel for data transmission scheduled based upon control information sent over their low power channel. This technique avoids wastage of the primary channel bandwidth caused by sending control and scheduling information over the primary channel.

Beginning at step 400, the wireless computing device registers with the brick server in a fashion such as previously discussed or otherwise. After registering with the access point, the low power transceiver transmits control information to the host transceiver logically connected to the access point, in step 402, informing the access point that the wireless computing device has data to transmit over the primary wireless channel. Types of control information include, but are not limited to, data packet priority information, data packet transmission deadline information, channel access information, and the number of data packets currently in a queue. Based upon this information and a scheduling algorithm, the access point, in step 404, generates a sorted list of nodes having data packets to transmit and the packet priority of each packet. After generating this list, the access point then transmits the appropriate scheduling information, in step 406, to each contending low power transceiver to notify the wireless computing device as to when it should send data over the primary channel through the standard NIC. Finally, in step 408, a wireless computing device proceeds to transmit the primary data over the 802.11 channel according to the received scheduling information, while the other wireless computing devices vying for the channel stand by. The scheduling information may also comprise a "wake-up" signal notifying a wireless computing device to power up and then to transmit data through the standard NIC. Such "wake-up" signals may be transmitted based upon the priority of the data on the list generated in step 404.

By placing the control information and scheduling information out of band with respect to the data transmission, the invention conserves and better utilizes the primary channel bandwidth. The control information and corresponding scheduling information is sent via the low power channel, whereas the useful data is sent via the primary channel. Therefore, true work conservation can result from proper work conserving algorithms.

One of skill in the art will recognize that numerous scheduling algorithms exist, any one or more of which can be used in conjunction with the present invention. Suitable scheduling algorithms include, but are not limited to, fair queuing and first come, first serve scheduling. Examples of fair queuing scheduling algorithms that can be used in conjunction with the present invention appear in S. Keshav, *On the Efficient Implementation of Fair Queueing*, Journal of Internetworking: Research and Experience, Volume 2, pages 27–73 (1991), herein incorporated by reference in its entirety for all that it discloses. Additionally, one of skill in the art will recognize that while the examples given above sometimes reference the 802.11 standard family of protocols, any communication protocols may be used to implement the present invention. Also note that although specific frequencies are given in the foregoing examples, any frequency that is supported in any section of the world may be used as the frequency for data transmission or control information transmission according to the present invention. Preferably, frequencies are used that are available internationally for devices that may be used internationally, thus avoiding RF interference and channel failure.

In another embodiment of the present invention, the scheduler at the access point is in synchronization with a scheduled wireless computing device, allowing scheduling of primary channel access prior to powering up the wireless network device. For example, if the access point and wireless computing device are rate synchronized, wherein the clocks of each count time at substantially the same rate, the access point can coordinate with the wireless computing device to power up after passage of a specified interval so that the primary NIC can transmit or receive data at that time. This is typically facilitated by use of a network timing protocol (NTP), or any other suitable protocol, over the low power channel through a low power transceiver that is held constantly ready to receive and/or transmit data. One of skill in the art will recognize that there are numerous other timing protocols and synchronization technologies that will work within the present invention to provide synchronized behavior.

Note that the low power control channel and the primary channel preferably employ different frequencies. In one example, the low power transceiver employs a carrier at 433 MHz or 915 MHz, while the standard NIC for the primary channel operates at 2.4 GHz. As discussed above, the low power transceiver and the standard NIC have different power usage requirements due in part to differences in frequency, data rate, and signal strength.

In a further embodiment, the powering up of the low power transceiver itself can be scheduled. This embodiment utilizes precise clock rate synchronization between the low power transceiver on a wireless device and the host transceiver located at the access point. When the low power transceiver and the host transceiver have access to clocks running at essentially the same rate, neither the low power transceiver nor the standard NIC need be maintained in a constantly active state. For example, when the low power transceiver has received an indication that transmission from its host device will be permitted after a specified interval, then both the low power transceiver and the standard NIC can be placed in a non-active mode during that interval after accounting for a known start-up delay of each. Note that although the clocks of the low power transceiver and the host transceiver need not reference identical rate clocks, the rates of both should be close enough that channel scheduling is not impacted by any inaccuracies to the extent that it results in transmission collisions or other detrimental behavior.

In an alternative embodiment of the present invention, illustrated in FIG. 6, the aforementioned scheduling function is performed at a host computer 206 containing a host transceiver 212, rather than at the wireless access point 210 itself. The host computer 206 may be connected to the network 202 via the wireless access point 210 or otherwise. This networking environment is built in substantially the same way as the environment wherein the wireless computing devices are connected directly to the access point 210. Note that in this or other embodiments, it is not required that both the primary and low power channels connect the same nodes. Thus, with reference to FIG. 6, a wireless device 220, 222 may communicate with the host computer 206 via the low power channel while communicating directly with the access point 210 via the primary (e.g. 802.11) channel.

While the invention is not limited to any particular radio range for the low power channel, it is preferable that the low power transceiver of the wireless computing devices 220 and 222 be spatially close enough to a host transceiver enabled access point 210 during operation to ensure RF signal reception and data integrity. However, it is still possible to have such low power communications even when the relevant low power transceiver is not within direct communication range of the host transceiver 212 operating at the access point, or at a host computer. Techniques for facilitating out-of-range communication are discussed in the following section of the detailed description.

Figure 8B:
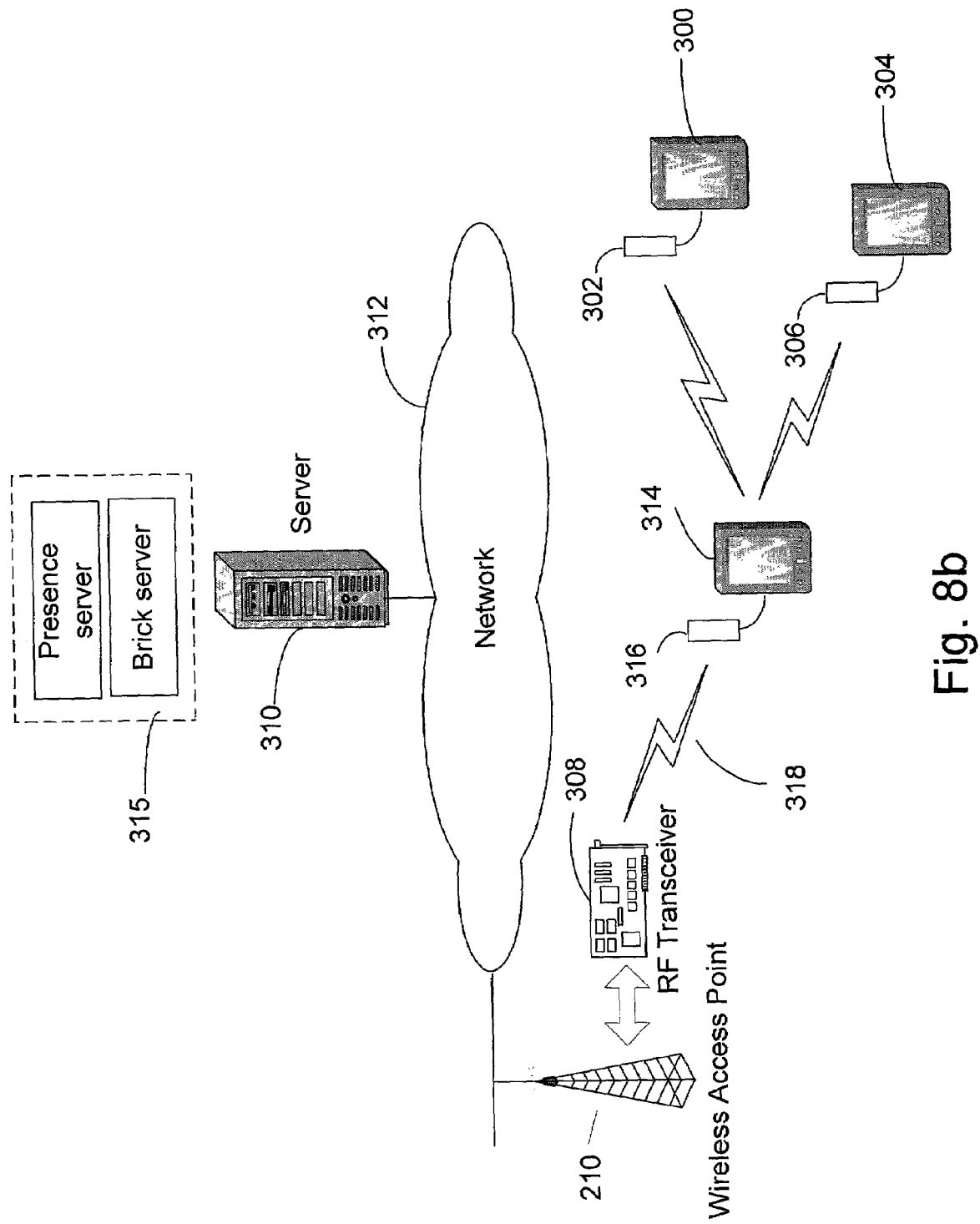
FIG. 8b is a schematic diagram illustrating a multi-hop network operating environment for optimizing channel scheduling when one or more of the multiple wireless devices vying for channel space are out-of-range, according to an embodiment of the invention.

In FIG. 8a, a first wireless computing device 300 operating a low power transceiver 302 and a second wireless computing device 304 operating a second low power transceiver 306 are shown to be out of a suitable direct range for supporting low power communication with an access point 210 operating a host transceiver 308. As such, with respect to each wireless computing device 300, 304, the low power transceiver 302, 306 is unable to directly communicate with the access point 210. In accordance with an embodiment of the invention, however, the first wireless computing device 300 may be able to communicate with the access point 210 using multi-hop networking, as illustrated in FIG. 8b. Specifically, when a third wireless computing device 314 operating a low power transceiver device 316 is within range of the access point 210, a low power control channel 318 is established between the third computing device 314 and host transceiver enabled device 210.

When the third wireless computing device 314 is also within range of another wireless computing device 300, 304, the low power transceiver operating on the wireless computing device 300, 304 establishes contact with the third wireless computing device 314 via a low power communication channel. In particular, the low power transceiver 302, 306 of the wireless computing device 300, 304 sends a message to the low power transceiver 316 of the third wireless computing device 314 for retransmission to the access point 210. The low power transceiver 316 of the third wireless computing device 314 then makes a determination as to whether to accept this request or not. If the request is accepted, a control channel is established between the third wireless computing devices 314 and the other device 300, 304. The low power transceiver 302, 306 associated with the out-of-range wireless computing device 300, 304 sends a registration message to the third wireless computing device 314 via the low power channel. This message is then forwarded by the third wireless computing device 314 to the host transceiver 308 operating at the access point 210, via the low power channel between the two. Once the registration of the low power transceiver 302, 306 of the out-of-range wireless computing device 300, 304 is recorded by the server 310, the out-of-range wireless computing device 300, 304 is able to engage in communication with other devices over the network 312.

Once the out-of-range wireless computing devices 300, 304 are registered, either one may then transmit control information, such as bandwidth requests, through the third wireless network device 314 to the host transceiver 308 at the access point 210, or host computer, as previously described above. Upon receiving the control information, the access point 210 applies a scheduling algorithm to all request information in order to schedule channel access for multiple wireless network devices seeking use of the same high power channel. The access point 210 then transmits the scheduling information through the host transceiver 308 to the third wireless network device 314 via a low power channel. When the scheduling information reaches the third wireless network device 314, it is forwarded to the pertinent out-of-range wireless network device. For example, if the scheduling information is in the form of a "wake-up" signal, then it would only be transmitted to the wireless device that is to be powered up in order to receive or transmit data, i.e. the device that has access to the channel at that time. If the scheduling information is in the form of a schedule of channel access of multiple wireless access devices, the scheduling information may be sent to any or all out-of-range devices as needed by the third wireless device.

Those skilled in the art will recognize that the above-described processes will often be carried out within an environment of more than two competing wireless computing devices although just two such devices are illustrated herein. As will be appreciated by those skilled in the art, whenever a number of wireless computing devices are within an appropriate low power radio range of one another, multi-hop communication can ideally be engaged by an unlimited number of such devices. This is particularly advantageous in the case of mobile wireless computing devices, such as PocketPCs, wherein a direct connection to a host transceiver enabled host, such as access point 210, may be limited as the device user roams from one location to another. Note that although two low power jumps are used in the described examples to reach an out-of-range device, any number of such jumps may be utilized without limitation. Furthermore, it is contemplated that one or more out-of-range devices may need to use multi-hop connectivity, while another device or devices are either in direct range, or at least require fewer hops.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method for channel access scheduling in a wireless network, wherein the wireless network comprises at, least one wireless computing device, the wireless computing device having an interface to a primary communication channel and an interface to a secondary communication channel, the secondary communication channel being of lower power than the primary communication channel, the method comprising:
    establishing a connection between a host transceiver at a host computer and a low power transceiver at the wireless computing device, the connection being established over the secondary channel;
    transmitting a first group of control information over the secondary channel from the low power transceiver to the host transceiver;
    receiving from the host transceiver a second group of control information at the low power transceiver, the second group of control information comprising scheduling information, wherein the scheduling information is transmitted in response to the control information sent by the low power transceiver; and
    automatically activating the interface to the primary communication channel in accordance with the received scheduling information.

2. The method according to claim 1 wherein the scheduling information is derived based at least in part on the number of packets waiting in a queue for transmission over the primary channel.

3. The method according to claim 1 wherein the control information comprises data packet priority information.

4. The method according to claim 1 wherein the control information comprises data packet transmission deadline information.

5. The method according to claim 1 wherein the secondary channel is a low frequency channel having a carrier frequency less than that of the primary channel.

6. The method according to claim 1 wherein the primary channel employs a different radio frequency than the secondary channel for transmission.

7. The method according to claim 1 wherein the primary channel is a high power channel that is not substantially used to communicate transmission scheduling information.

8. The method according to claim 1 wherein the host computer comprises a wireless access point to another network.

9. The method according to claim 1 wherein the network that is interfaced through the wireless access point comprises at least one wired link.

10. The method according to claim 1 wherein in response to receipt of the scheduling information, the wireless computing device further transmits data over the primary channel.

11. The method according to claim 1 wherein the interface to the primary channel implemented at the wireless computing device comprises a network interface card.

12. The method according to claim 1 wherein the primary channel comprises an 802.11 based communication channel.

13. A wireless network system for channel access control in a wireless network comprising:
    an access point, wherein the access point is logically connected to a first radio component configured to transmit scheduling information over a secondary low power channel and a second radio component configured to transmit data over a higher power primary channel; and
    a client device comprising:
        a high power radio component that communicates data on a primary channel, wherein the data omits scheduling information related to primary channel access; and
        a low power radio component that communicates control information to the access point over the secondary low power channel.

14. The wireless network system according to claim 13 wherein the primary channel and secondary channel employ mutually distinct carrier frequencies.

15. The wireless network system according to claim 13 wherein the wireless computing device is interfaced to the primary channel via a wireless network interface card.

* * * * *